United States Patent

[11] 3,608,955

| [72] | Inventor | Keith W. Tantlinger<br>Grosse Pointe Shores, Mich. |
|---|---|---|
| [21] | Appl. No. | 608,101 |
| [22] | Filed | Jan. 9, 1967 |
| [45] | Patented | Sept. 28, 1971 |
| [73] | Assignee | Fruehauf Corporation |

[54] METHOD OF MAKING TRUCKS, TRAILERS AND THE LIKE
4 Claims, 3 Drawing Figs.

| [52] | U.S. Cl. | 296/28 M |
|---|---|---|
| [51] | Int. Cl. | B62d 33/00 |
| [50] | Field of Search | 296/28, 28 M, 29, 36; 52/264, 245, 300; 105/409, 410, 401, 402 |

[56] References Cited
UNITED STATES PATENTS

| 2,888,297 | 5/1959 | Ridgway | 296/28 (.2) |
|---|---|---|---|
| 3,097,877 | 7/1963 | Erlandsen | 296/28 (.2) |
| 1,055,713 | 3/1913 | Craig | 296/29 |
| 1,055,714 | 3/1913 | Craig | 296/29 |
| 2,172,571 | 9/1939 | Theriault | 296/28 (.2) |

Primary Examiner—Benjamin Hersh
Assistant Examiner—John A. Pekan
Attorney—Harness, Dickey & Pierce ABSTRACT: A trailer body has a platform to which two independent built-up side and front sections of the opposite hand are attached to the rear doorframe and the front and side edges of the platform and to each other by an upright extending upwardly from the platform centrally of the front edge thereof.

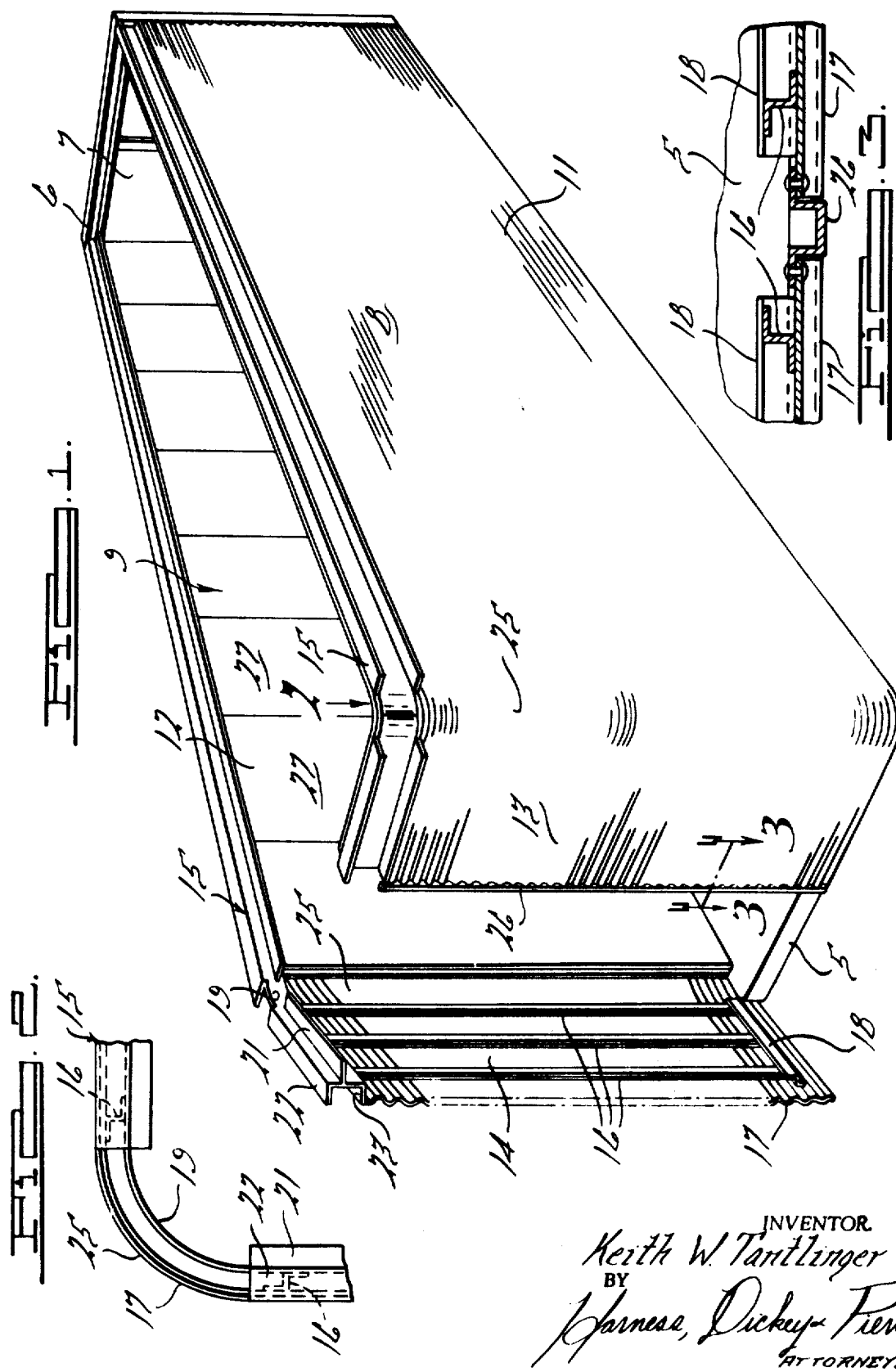

METHOD OF MAKING TRUCKS, TRAILERS AND THE LIKE

By employing two L-shaped panels for forming the two sides and front wall of the trailer body, the front corner posts are eliminated and the construction is substantially simplified. A rear frame for a pair of doors extends upwardly from the rear edge of a floor platform to the jambs of which the ends of the L-shaped panels are secured when attached to the side edges of the platform. The ends of the short front sections of the panels are spaced at the center of the platform and are secured to an upright thereat and to the front edge of the platform which has rounded corners engaged by the curved corner portions between the panel sections. This may be formed in situ, the extending front sections being bent at a 90° angle to the sidewall sections on a radius of sufficient length to prevent any substantial deforming of the horizontal corrugations in the panels. To the lower side of a channel-shaped rail having a central rearwardly extending flange the upper ends of spaced uprights are secured with the lower ends secured to an L-shaped member which rests upon the bottom platform. The outer horizontally corrugated sheets are secured to the frame member by rivets, screws or the like, and the flanges of the channel are cut away at the corners between the sections, leaving a vertically disposing web which readily forms with the corrugated sheet to arcuate shape in a simple operation. The floor platform serves as a mandrel at the bottom for the outer wall sheet or skin while the vertical web of the top rail can be readily bent about a mandrel as the two end sections are swung around into mating engagement with a central upright. With this arrangement, the entire side and end sections of the trailer body can be constructed flat as a unit, moved into vertical position and attached to the side edges of the platform and the jambs. This can be done with the two sections of each panel at right-angle or the end sections can be swung around to form the arcuate corners and close the front end of the trailer body after the side sections are secured in position.

Accordingly, the main objects of the invention are: to provide two built-up panels having a side and a front section which are supported on the side and front edges of a floor platform with the front sections joined to a front central upright; to form the sides and front of a trailer body from two panels each having a side section and half front section which are secured at the bottom to the floor platform and to a central upright at the front end with the corners between the sections of arcuate shape; to form the side and the front panel sections of a trailer body as a unit which arcuate corner portions struck on a sufficient radius to prevent the outer sheet from distorting, and in general, to provide a trailer body which is simple in construction, which eliminates the cornerposts at the front and which is economical of manufacture.

Other objects and features of novelty of the invention will be specifically pointed out or will become apparent when referring, for a better understanding of the invention, to the following description taken in conjunction with the accompanying drawing, wherein:

FIG. 1 is a perspective view of a trailer body having side and front walls which embody features of the present invention;

FIG. 2 is an enlarged broken view of the structure illustrated in FIG. 1, as viewed from the point 2 thereof, and FIG. 3 is a sectional view of the structure illustrated in FIG. 1, taken on the line 3—3 thereof.

The trailer body of the present invention has a floor platform 5 on which a doorframe 6 is secured at the rear end with a pair of doors 7 hinged therein. Two panels 8 and 9 form the sides and front end walls of the body and are of similar construction except for being of the opposite hand. The panels are constructed as flat units to have a flat sidewall section 11 and 12 with front end sections 13 and 14 extending therefrom. Each unit 8 and 9 has a frame embodying a top rail 15 and an offset bottom rail 18 which are interconnected by posts or uprights 16. The outer covering or skin 17 is riveted, screwed or otherwise secured to the uprights and bottom rail 18 to form the outer surface of the side and front end walls. The covering or skin is preferably made of a corrugated sheet having the corrugations extending horizontally and it is to be understood that a plane sheet or one with vertical corrugations could also be employed. The top rail is formed from an outwardly facing channel having a web 19 from which a flange 21 extends inwardly. The web 19 has outwardly extending spaced flanges 22 and 23 at the top and bottom edges which provides substantial strength to the rail. At the corners between the sections 11 and 13 and 12 and 14 of the panels, the flanges 21, 22 and 23 are cut away leaving the vertical web portion 19 in the area between the sections. The web 19 is readily bent arcuately as illustrated in FIG. 2 when the sections 13 and 14 are moved into right-angle relationship to the sections 11 and 12.

After the unit panels 8 and 9 are constructed with the flanges cut away at the corners, the two sections 11 and 13 may be bent in right-angles to each other to form the arcuate corners 25 in the outer skin material 17 and the web 19 spaced therefrom, as illustrated in FIG. 2. With this arrangement, the panel 8 has the end of the section 13 engaged with a U-shaped upright 26 and the end of the covering sheet or skin 18 secured thereto by rivets, screws or the like. After the panel 11 with the section 13 disposed at right-angles thereto is secured to the edge of the floor platform 5, the unit 9 with the sections 12 and 14 thereof disposed in right-angle relation to each other is then secured to the side and front edges of the platform and to the upright 26 in a similar manner to complete the front and sidewall structure of the body. Inner wall panels 27 may be applied to the inner faces of the side and front end walls to reinforce the walls and provide a smooth surface therefor.

As pointed out above, it is within the purview of the invention to apply sections 11 and 12 of the panels 8 and 9 to the side edges of the floor platform 5 with the end sections 13 and 14 extending in continuation thereof. Thereafter, each of the sections 13 and 14 are moved into aligned relation to each other as the covering sheets or skin 17 and the web 19 is bent in an arc of substantial radius so that little deformation will occur to the corrugations of the covering sheets 17.

The arcuate corners eliminate the front end frame and cornerposts and a substantial amount of labor is eliminated for constructing the front and sidewalls of the body. When a roof of conventional form is secured to the top rails 15, the side and front sections and the rear doorframe are retained in firm fixed relation to each other to add rigidity to the body. It is to be understood that panels 27 may be attached to the inner face of the sections 13 and 14 and, if desired, arcuate panels can be applied to the inner corner portions.

When the end sections 13 and 14 are swung into planar relation to each other, the bottom rails 18 will rest upon the top edge of the floor platform 5 to which it is secured to add strength to the uprights 16 and to the front panel sections.

What is claimed is:

1. In a trailer body, a platform a rear doorframe on said platform, two built-up units of the opposite hand each having a frame including top and bottom rails forming a side section and a portion of a front section, upright members joined to said top and bottom rails, an outer covering material on said frame joined to said rails and upright members and forming the side and front sections in a continuous planar construction, each said unit being joined to said doorframe with the bottom rails secured to the platform at the front and side edges thereof, each said unit being arcuately formed at the junction between the side and front sections which are located at right angles to each other, said top rails having flanges which are removed at the arcuate corners leaving a vertical web thereat.

2. In a trailer body as recited in claim 1, wherein the bottom rail is of Z section having a portion resting upon the platform and a portion engaging the edge thereof when the sections are secured to the platform.

3. In a trailer body as recited in claim 2, wherein the front sections extend frontwardly of the platform in alignment with the side sections after the side sections have been secured to the platform before the front section is secured thereto.

4. In a trailer body as recited in claim 3, wherein an upright member of channel shape having an out web and laterally extending flanges is provided at the front center of the platform, and means for securing the ends of the covering material of the front sections to said flanges of the upright member with the web disposed therebetween.